(12) United States Patent
Zhang

(10) Patent No.: US 7,765,383 B2
(45) Date of Patent: Jul. 27, 2010

(54) DATA PROCESSING UNIT AND DATA PROCESSING APPARATUS USING DATA PROCESSING UNIT

(75) Inventor: Jun Zhang, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 386 days.

(21) Appl. No.: 11/826,598

(22) Filed: Jul. 17, 2007

(65) Prior Publication Data

US 2008/0040582 A1 Feb. 14, 2008

(30) Foreign Application Priority Data

Aug. 11, 2006 (JP) ............... 2006-219122

(51) Int. Cl.
*G06F 13/12* (2006.01)
(52) U.S. Cl. ..................................... 712/34
(58) Field of Classification Search .................. None
See application file for complete search history.

(56) References Cited

U.S. PATENT DOCUMENTS 5,588,125 A * 12/1996 Bennett ................ 710/306

| | | | | |
|---|---|---|---|---|
| 6,141,770 A * | 10/2000 | Fuchs et al. | .................. | 714/11 |
| 6,189,075 B1 * | 2/2001 | Sanches | .................. | 711/141 |
| 6,449,732 B1 * | 9/2002 | Rasmussen et al. | .......... | 714/12 |
| 6,732,300 B1 * | 5/2004 | Freydel | .................. | 714/36 |
| 2002/0010880 A1 * | 1/2002 | Williams | .................. | 714/43 |
| 2002/0062427 A1 * | 5/2002 | Chauvel et al. | ............. | 711/151 |
| 2005/0246581 A1 * | 11/2005 | Jardine et al. | .................. | 714/12 |

FOREIGN PATENT DOCUMENTS

| JP | 05-120081 A | 5/1993 |
|---|---|---|
| JP | 2002-197049 A | 7/2002 |

* cited by examiner

*Primary Examiner*—Eric Coleman
(74) *Attorney, Agent, or Firm*—Arent Fox LLP

(57) ABSTRACT

A storage unit retains processing target data, a data processing circuit processes the data retained in the storage unit, a connection unit is connected to a processing device that executes a computer program, and a control unit invalidates, when a predetermined condition is detected, the data processing by the data processing circuit and requests a processing device connected to the connection unit for the data processing.

18 Claims, 5 Drawing Sheets

DATA PROCESSING UNIT AND DATA PROCESSING APPARATUS USING DATA PROCESSING UNIT

BACKGROUND OF THE INVENTION

The present invention relates to a data processing technology of alternatively using a hardware circuit and a processing device installed with a computer program having the same function as a processing function of the hardware circuit.

BACKGROUND ART

FIG. 1 is a block diagram showing an example of a basic configuration of an embedded system. In this system, a CPU (Central Processing Unit) 100 executes software (which is also termed a computer program), whereby data stored in a memory 101 is read, and a data processing circuit device 102 performs data processing. A processing result of the data processing circuit device 102 is read out to the CPU via a bus 103 and is written to the memory 101. Further, the data stored in the memory 101 is outputted to an I/O device 105 under the control of a DMA (Direct Memory Access) controller 104. The data processing circuit device 102 executes the data processing, whereby a processing load of the CPU 100 can be shared.

The data processing circuit device 102 in FIG. 1 is constructed of a single data processing unit or a plurality of data processing units. FIG. 2 is a block diagram showing a basic structure of the data processing unit included in the conventional data processing circuit device 102. In the data processing unit illustrated in FIG. 2, input data is written to an input register DREG0 200. Along with writing the input data, a valid signal showing whether the input data is valid or not is also written to a register V0 201.

The data outputted from the input register DREG0 200 and the valid signal outputted from the register V0 201 are outputted to a data processing circuit 204 under the control of a read signal Read0.

The data processing circuit 204 implements a data processing algorithm f, and processes the data read from the input register DREG0 200. After one clock cycle or a plurality of clock cycles, a processing result of the data processing circuit 204 is written to an output register DREG1 205. Along with writing the processing result, a valid signal showing whether the processing result is valid or not is also written to a register V1 206. Finally, the output data outputted from the output register DREG1 205 and the valid signal outputted from the register V1 206 are outputted as a final processing result under the control of a read signal Read1. Alternatively, the output data outputted from the output register DREG1 205 and the valid signal outputted from the register V1 206 are further inputted to the next data processing unit and are processed by the next data processing algorithm.

The valid signal outputted from the input register V0 201 is inverted by a NOT cell 203. Then, OR is obtained from the inverted valid signal together with the read signal Read0 given from the data processing circuit 204 by an OR cell 202, and a write control signal WriteEnable0 for the register DREG0 200 and the register V0 201 is generated. When the valid signal outputted from the register V0 201 becomes "0" or when the read signal Read0 becomes "1", it is possible to write the input data and the valid signal showing whether the input data is valid or not to the input register DREG0 200 and to the register V0 201.

The valid signal outputted from the register V1 206 is inverted by a NOT cell 208. Then, OR is obtained from the inverted valid signal together with a read signal Read1 by an OR cell 207, and a write control signal WriteEnable1 for the output register DREG1 205 and the register V1 206 is generated. When the valid signal outputted from the register V1 206 becomes "0" or when the read signal Read1 becomes "1", it is feasible to write a processing result of the data processing circuit 204 and a valid signal showing whether the processing result is valid or not to the output register DREG1 205 and to the register V1 206. If the data processing of a subsequent processing unit stops, a data processing pipeline can be temporarily stalled (suspended) by inhibiting a write operation to the input register DREG0 200, the register V0 201, the output register DREG1 205 and the register V1 206.

Further, software executed by the CPU 100 in the embedded system explained with reference to FIG. 1 as a debug function is accessible to the input register DREG0 200 and to the output register DREG1 205 via the data bus 209.

[Patent document 1] Japanese Patent Application Laid-Open Publication No. 5-120081
[Patent document 2] Japanese Patent Application Laid-Open Publication No. 2002-197049

SUMMARY OF THE INVENTION

As described above, in the data processing circuit 204, the function is actualized by the semiconductor circuit. Accordingly, if a trouble occurs due to a design mistake in the data processing circuit 204 and in the case of there arising a necessity of taking a measure against it, or in the case of desiring to change the algorithm f carried out by the data processing circuit 204, the product actualized in the semiconductor circuit can not be continuously used. In this case, the development is redone, or there might be a case where the cost rises.

The present invention was devised to solve the problems described above. Namely, it is an object of the present invention to enable, if the trouble occurs in the hardware circuit and in the case of there being the necessity of taking the measure against it or in the case of desiring to change the data processing algorithm of the hardware circuit, an as-is continuous use of the product including the hardware circuit, actualization of the cost-down and reduction in the number of processes of developing the product.

The present invention adopts the following means in order to solve the problems.

(1) Namely, the present invention is a data processing unit comprising a storage unit retaining processing target data, a data processing circuit processing the data retained in the storage unit, a connection unit connected to a processing device that executes a computer program, and a control unit invalidating, when a predetermined condition is detected, the data processing by the data processing circuit and requesting the processing device connected to the connection unit for the data processing.

According to the present invention, when the predetermined condition is detected, it is possible to invalidate the data processing by the data processing circuit and to request the processing device connected to the connection unit for the data processing. Herein, the predetermined condition is, for example, a setting value in a register, wherein if a problem arises in the data processing by the data processing circuit or if desiring to change the processing, this processing may be invalidated.

(2) The control unit may include a read control unit that provides the data processing circuit with the data in the storage unit in response to a first read request signal given from the data processing circuit, and provides the processing device with the data in the storage unit via the connection unit in response to a second read request signal given from the processing device via the connection unit.

(3) Further, the control unit may further include a write control unit that selects any one of output data given from the data processing circuit and output data given from the processing device via the connection unit, and gets the selected output data outputted to the storage unit.

With such a configuration, the control unit selects any one of the data processing circuit and the processing device, then hands over the data and can acquire the processing result.

(4) The data processing unit may further comprise an interrupt mask register that can be set from the processing device via the connection unit, wherein when a setting value in the interrupt mask register is a first value, the read control unit may block the second read request signal given from the processing device, and may provide the data processing circuit with the data in the storage unit, and the write control unit may get the output data of the data processing circuit outputted to the storage unit.

According to the present invention, the second read request signal from the processing device is blocked depending on the setting value in the interrupt mask register, whereby the control can be done so that the data processing circuit processes the data.

(5) In the data processing unit, when the interrupt mask register takes a second value, the read control unit may block the first read request signal given from the data processing circuit and may provide the processing device with the data in the storage unit via the connection unit, and the write control unit may get the output data of the processing device outputted to the storage unit.

According to the present invention, the first read request signal from the data processing circuit is blocked depending on the setting value in the interrupt mask register, whereby the control can be done so that the processing device processes the data.

(6) The storage unit may include a first storage unit stored with processing target input data of the data processing circuit or the processing device, and a second storage unit stored with output data processed by the data processing circuit or the processing device.

(7) The read control unit may further, when a valid signal showing whether the input data is valid or not indicates validity, provide the data in the storage unit.

(8) The control unit may further include a write-to-the-first-storage-unit control unit that generates, when the read control unit provides the input data to neither the data processing circuit nor the processing device and when the valid signal indicates that the input data is valid, a signal for inhibiting next processing target input data which should be processed next from being written to the first storage unit.

According to the present invention, when the valid data is not yet processed by the data processing unit, the next new input data can be restricted from being inputted to the first storage unit. With this restriction, in the case where switchover between the partial circuit and the software is needed, the switchover can be done after ensuring the data in safety.

(9) Still further, the present invention may also be a data processing apparatus comprising a connection unit connected to a processing device executing a computer program, and a plurality of data processing units connected to the processing device via the connection unit, each of the data processing units, including a storage unit retaining processing target data, a data processing circuit processing the data retained in the storage unit, a connection unit connected to a processing device that executes a computer program, and a control unit invalidating, when a predetermined condition is detected, the data processing by the data processing circuit and requesting the processing device connected to the connection unit for the data processing.

Namely, according to the present invention, in the data processing apparatus including the plurality of data processing units, in the same way as above, the data processing unit, from which the predetermined condition is detected, is invalidated, and the processing device as a substitute for this data processing unit can be requested to process the data.

(10) The data processing device may further comprise an interrupt mask register retaining a plurality of bits each controlling a data processing method of a data processing unit corresponding to each of the bits, and the control unit may include a generating unit that generates a processing request signal for requesting, when the valid signal showing whether the input data is valid or not indicates the validity and when the bit in the interrupt mask register corresponding to the data processing unit including the control unit concerned takes a predetermined value, the processing device to process the input data retained in the first storage unit of the data processing unit.

Namely, when the interrupt mask register requests the processing by the processing device and when the input data is valid, the processing device may be made to actually execute the processing.

(11) The data processing device may comprise a priority determining unit judging which process request signal should be preferentially processed in process request signals generated by two or more data processing units, and a request retaining unit retaining, when one of the first read request signal and the second read signal to be preferentially processed is selected, a request status till other not-yet-processed read request signals can be processed.

With this configuration, when the processing requests are given from the plurality of data processing units, the processing device can process in the predetermined order of priority.

According to the present invention, if the trouble occurs in the hardware circuit and in the case of there being the necessity of taking the measure against it or in the case of desiring to change the data processing algorithm of the hardware circuit, it is possible to continuously use the product actualized by the hardware circuit as it is.

DETAILED DESCRIPTION OF THE INVENTION

A data processing device according to a best mode (which will hereinafter be termed an embodiment) for carrying out the present invention will hereinafter be described with reference to the drawings. Configurations in the following embodiments are exemplifications, and the present invention is not limited to the configurations in the embodiments.

Substance of the Invention

A technology related to the data processing device is effective in a complicated data processing circuit and in a circuit that is liable to have occurrence of a trouble such as a bug etc. Namely, the present technology is effective especially in changing a system including such a circuit that existence of a prospective trouble is predicted, or a possibility of changing an algorithm is presumed. In the data processing device, a function of actualizing data processing by software in place of the data processing circuit defined as hardware, is provided. If none of the trouble occurs, the data processing device executes the data processing by the hardware data processing circuit in the same way as by the prior art. When the trouble occurs in the data processing circuit, or when desiring to change the algorithm, the data processing device invalidates an operation of the data processing circuit by setting a value in a register. Then, switchover to a software processing method is attained by an interrupt to a processing device such as a CPU that executes the software.

Herein, the phrase "invalidating the operation of the data processing circuit" connotes blocking an access to processing target input data of the data processing circuit and stopping an output of a result of the processing by the data processing circuit. Then, in place of the data processing circuit, a processing device such as a CPU, which executes the software, accesses the input data, processes the input data and outputs a result of this processing.

First Embodiment

Figure 1:
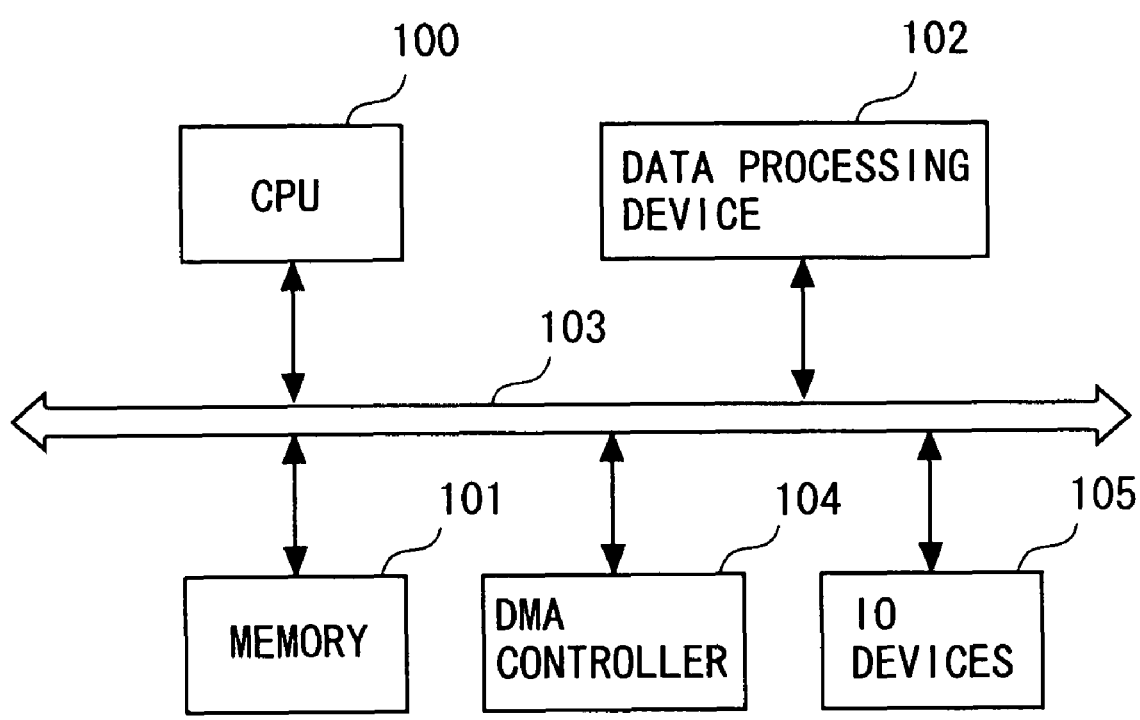
FIG. 1 is a block diagram showing an example of a basic configuration of a conventional embedded system.
Figure 2:
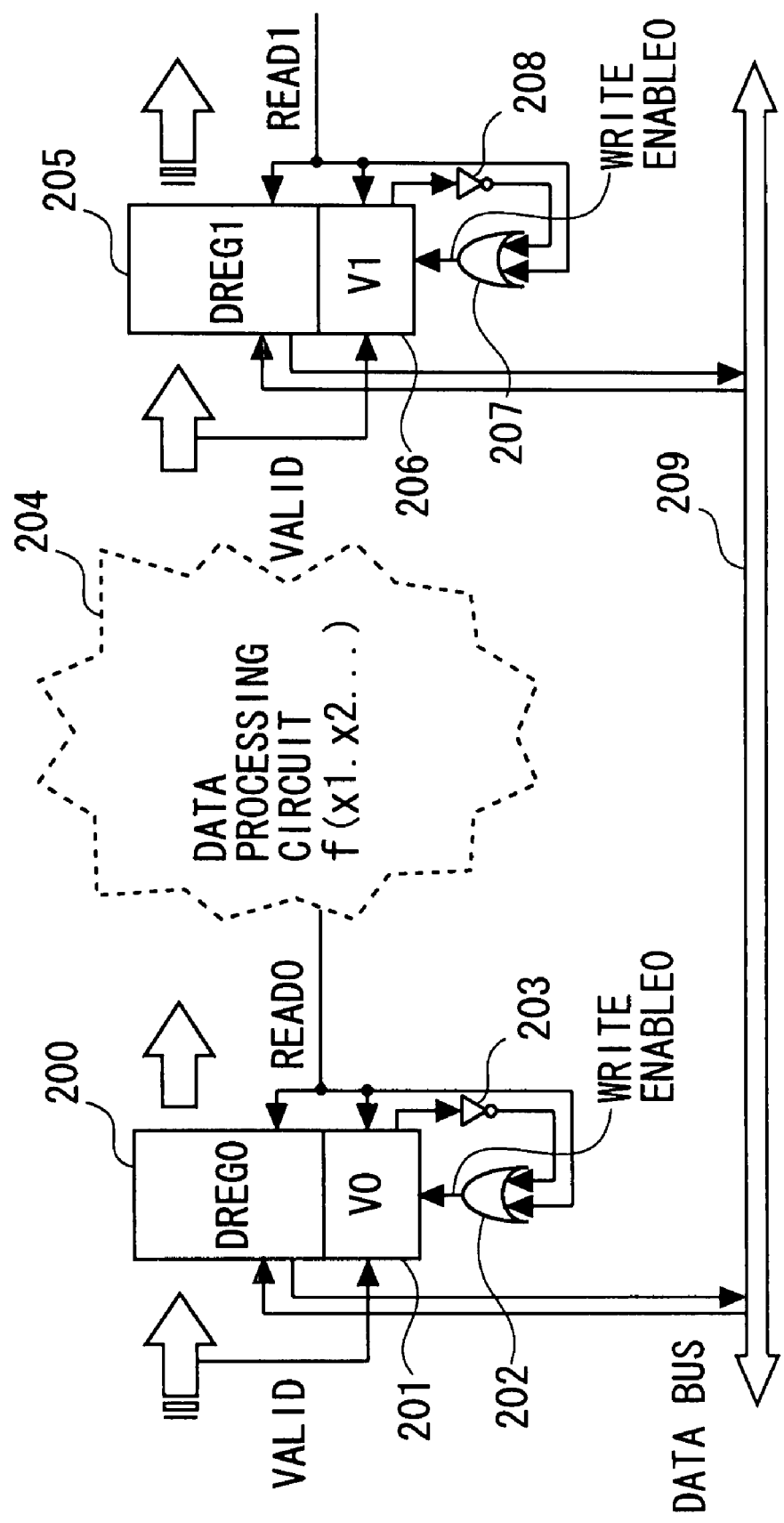
FIG. 2 is a block diagram showing a basic structure of a conventional data processing unit in the embedded system shown in FIG. 1.

The data processing device according to the present invention is configured in the same way as in the example of the system explained referring to FIG. 1. An embodiment of the data processing device and an embodiment of a data processing method according to the present invention will be described in detail with reference to the accompanying drawings.

Figure 3:
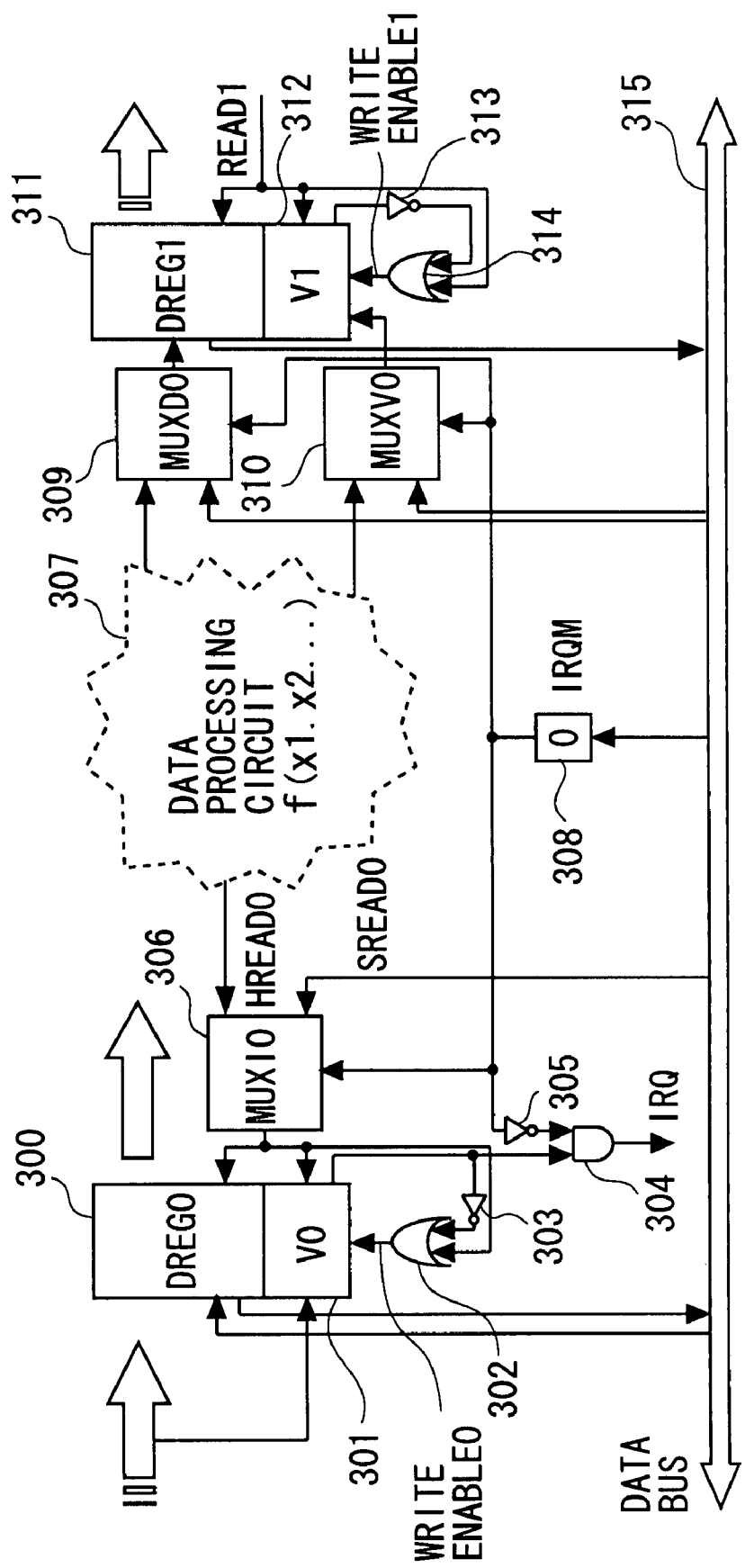
FIG. 3 is a block diagram showing a basic configuration of a data processing unit according to an embodiment of the present invention.

FIG. 3 shows a basic construction of a data processing unit as a main unit of the data processing apparatus according to the first embodiment. This data processing apparatus includes, though omitted in FIG. 3, a plurality of data processing units. Each data processing unit has an input register DREG0 300 (which corresponds to a storage unit according to the present invention and is also referred to as a first storage unit), a register V0 301 indicating validity or invalidity of the input data retained by the input register DREG0 300, a data processing circuit 307 defined as a hardware circuit that reads the input data from the input register DREG0 300 and processes this input data, an output register DREG1 311 (which corresponds to a storage unit according to the present invention and is also referred to as a second storage unit) to which a result of the output of the data processing circuit 307 is outputted, and a register V1 312 indicating validity or invalidity of the output data retained by the output register DREG1 311. The data processing units are connected at a plurality of stages via the input registers DREG0 300 and the output registers DREG1 311, whereby the data processing apparatus can be configured on a larger scale.

Further, in the data processing unit shown in FIG. 3, a CPU 100 (corresponding to a processing device according to the present invention) is connected to a bus 315 (corresponding to a connection unit according to the present invention). The CPU 100 executes the software and is thereby capable setting an interrupt mask register IRQM308 via the bus 315. Thus, in the data processing unit, the data processing method is switched over depending on a setting value given from the outside (the CPU etc).

When the interrupt mask register IRQM308 is "1", the data, which should be processed by a data processing algorithm f, is subjected to the data processing by the data processing circuit 307. On the other hand, when the interrupt mask register IRQM308 is "0", the data processing circuit 307 is invalidated. At this time, with the interrupt occurred, the CPU 100 executes the software, thereby processing the data.

In an example in FIG. 3, the input data is written to the input register DREG0 300. Together with the input data, a valid signal, showing whether the input data is valid or not, is also written to the register V0 301. An output signal of the interrupt mask register IRQM308 is inverted by a NOT cell 305, and, together with the valid signal outputted from the register V0 301, an AND is obtained by an AND cell 304, thereby generating an interrupt request signal IRQ (also referred to as a processing request signal).

Namely, in the example in FIG. 3, when the interrupt mask register IRQM308 is "0" (which is an instruction of the processing by the software) and when the register V0 301 shows that the input data is valid (or that the input data is not yet processed), the interrupt request signal IRQ to the CPU 100 is generated.

A selector MUXI0 306 selects one of a read signal HRead0 (corresponding to a first read request signal) given from the data processing circuit 307 and a read signal SRead0 (which is also referred to as a second read request signal) outputted by the CPU 100 via the bus 315. The selected read signal is outputted to the input register DREG0 300 and to the register V0 301. Further, the valid signal outputted from the register V0 301 is inverted by a NOT cell 303, and, together with the read signal outputted from the selector MUXI0 306, an OR is obtained by an OR cell 302. This OR leads to generation of a write control signal WriteEnable0 for the input register DREG0 300 and for the register V0 301.

Namely, in any one of a case that the valid signal shows the invalidity of the input data or a case that the read signal is outputted (the data has already been read), the write to the input register DREG0 300 and to the register V0 301 is permitted. Conversely, when the valid signal shows the validity and when the read signal is not outputted (the data is not yet completely read), the write to the input register DREG0 300 and to the register V0 301 is not permitted.

The output signal from the interrupt mask register IRQM308 controls the selector MUXI0 306. When the output signal from the interrupt mask register IRQM308 is "1", the read signal HRead0 outputted from the data processing circuit 307 is selected. When IRQM is "0", the read signal SRead0 generated via the bus 315 by the software executed by the CPU 100, is selected.

A selector MUXD0 309 and a selector MUXV0 310 select any one of followings. One is a combination of the processing result outputted from the data processing circuit 307 and the valid signal. The other is a combination of the processing result obtained by the softwarewise processing of the CPU 100 and written via the bus 315 and the valid signal. Then the selected combination is written to a register DREG1 311 and to a register V1 312. The output signal from the interrupt mask register IRQM308 controls a selector MUXD0 309 and a selector MUXV0 310. When the output signal from the interrupt mask register IRQM308 becomes "1", the combination of the processing result outputted from the data processing circuit 307 and the valid signal is selected. When the output signal from the interrupt mask register IRQM308 becomes "0", the combination of the processing result obtained by the softwarewise processing of the CPU 100 and written via the bus 315 and the valid signal, is selected.

If any trouble does not happen in the data processing circuit 307 and in the case of no necessity of taking a measure against the trouble or in the case of changing none of the data processing algorithm f, the CPU 100 executing the software sets "1" in the interrupt mask register IRQM308 via the bus 315. In this case, the data processing unit is switched over to the processing method by which the data processing circuit 307 executes the data processing.

Even when the output signal of the register V0 301 becomes "1", the output signal from the interrupt mask register IRQM308 is inverted by the NOT cell 305 and becomes "0", and therefore the interrupt request signal IRQ is masked, with the result that the interrupt does not occur. The read signal HRead0 given from the data processing circuit 307 is selected by the selector MUXI0 306 under the control of the output signal given from the interrupt mask register IRQM308, and is outputted to the input register DREG0 300 and to the register V0 301. As a result, the data outputted from the input register DREG0 300 and the valid signal outputted from the register V0 301 are processed by the data processing circuit 307.

Then, the processing result outputted from the data processing circuit 307 and the valid signal are selected by the selector MUXD0 309 and the selector MUXV0 310 under the control of the output signal given from the interrupt mask register IRQM308. The selection processing result and the selected valid signal are written to the output register DREG1 311 and to the register V1 312. Finally, the data outputted from the output register DREG1 311 and the valid signal outputted from the register V1 312 are outputted as a final processing result under the control of the read signal Read1. Alternatively, the data outputted from the output register DREG1 311 and the valid signal outputted from the register V1 312 are further inputted to the next data processing unit and then processed by the next data processing algorithm.

If the trouble occurs in the data processing circuit 307 or in the case of changing the algorithm f, the software executed by the CPU 100 sets "0" in the interrupt mask register IRQM308 via the bus 315. As a result, the switchover to the software processing method is done by the CPU 100. Specifically, when the output signal given from the register V0 301 becomes "1", the output signal from the interrupt mask register IRQM308 is inverted by the NOT cell 305 and becomes "1", and hence the interrupt request signal IRQ becomes "1", whereby the interrupt to the CPU 100 occurs. The read signal HRead0 from the data processing circuit 307 is ignored, without being selected by the selector MUXI0 306, under the control of the output signal from the interrupt mask register IRQM308. Further, the processing result of the data processing circuit 307 is ignored without being selected by the selector MUXD0 309 and the selector MUXV0 310. As a consequence, the data processing circuit 307 is invalidated. Further, the write control signal WriteEnable0 generated by the read signal selected by the register V0 301 and by the selector MUXI0 306 becomes "0", and therefore the write operation to the input register DREG0 300 and to the register V0 301 is inhibited. When the write operation is inhibited, it follows that the present input data is kept in the input register DREG0 300 and in the register V0 301 without writing from the anterior stage the next data that should be newly processed.

The software executed by the CPU 100 enters an interrupt processing mode in response to the interrupt request signal IRQ. The software executed by the CPU 100 issues a read signal SRead0 via the bus 315. The read signal SRead0 is selected by the selector MUXI0 306 and is outputted to the input register DREG0 300 and to the register V0 301. The data read from the register V0 301 is transferred to the CPU 100 via the data bus 315. Along with this transfer, the read signal SRead0 selected by the selector MUXI0 306 becomes "1", and hence the write control signal WriteEnable0 generated by the OR cell 302 becomes "1", whereby the new data can be written to the input register DREG0 300 and to the register V0 301. Namely, since the input data of the input register DREG0 300 and of the register V0 301 have been processed by the CPU 100, it follows that the next data, which should be newly processed, is written from the anterior stage.

When the new data is valid, the output signal of the register V0 becomes "1", and the interrupt request signal IRQ is newly generated by the AND cell 304. If not so, the interrupt request signal IRQ becomes "0", and none of new interrupt occurs. When the software executed by the CPU 100 completes the data processing by use of the algorithm f, the processing result is selected by the selector MUXD0 309 via the data bus 315 and is written to the output register DREG1 311. Along with this write, the valid signal showing whether the processing result is valid or not, is also selected by the selector MUXV0 310 and is written to the register V1 312. Finally, the CPU 100 terminates the interrupt mode and returns to the normal processing mode. While on the other hand, when the new data is valid, the software stays in a new interrupt mode due to a newly generated interrupt request signal.

The processing result written to the output register DREG1 311 and the valid signal written to the register V1 312 are outputted as a final processing result under the control of the read signal Read1. If the data processing unit further exists at the next stage, however, the processing result written to the output register DREG1 311 and the valid signal written to the register V1 312 are further inputted to the next data processing unit and are processed by the next data processing algorithm.

As described above, in the data processing unit according to the first embodiment, if the trouble occurs in the data processing circuit 307 and in the case of there being the necessity of taking the measure against the trouble, or in the case of desiring to change the data processing algorithm f, the data processing circuit 307 is separated from other components of the data processing unit.

Namely, the interrupt to the CPU 100 occurs due to the interrupt mask register IRQM308 and the valid signal of the register V0, and the software equal to the algorithm of the data processing circuit 307 is executed.

Moreover, with the setting in the interrupt mask register, the read signal from the data processing circuit 307 is ignored, and the output result from the data processing circuit 307 gets non-selective in the selector.

On the other hand, the read signal given from the CPU 100 is selected, and the data of the input register DREG0 300 is read out to the CPU 100. Then, the processing result in the CPU 100 is written to the output register DREG1 311. Subsequently, till these processes are completed, the write operation to the input register DREG0 300 and to the register V0 301 is inhibited.

Thus, the processing of the data processing circuit is switched over to the software processing method by taking the configuration of separating the data processing circuit, thereby making it possible to continuously use the product as it is, which includes the functions actualized by the hardware circuit.

Second Embodiment

Figure 4:
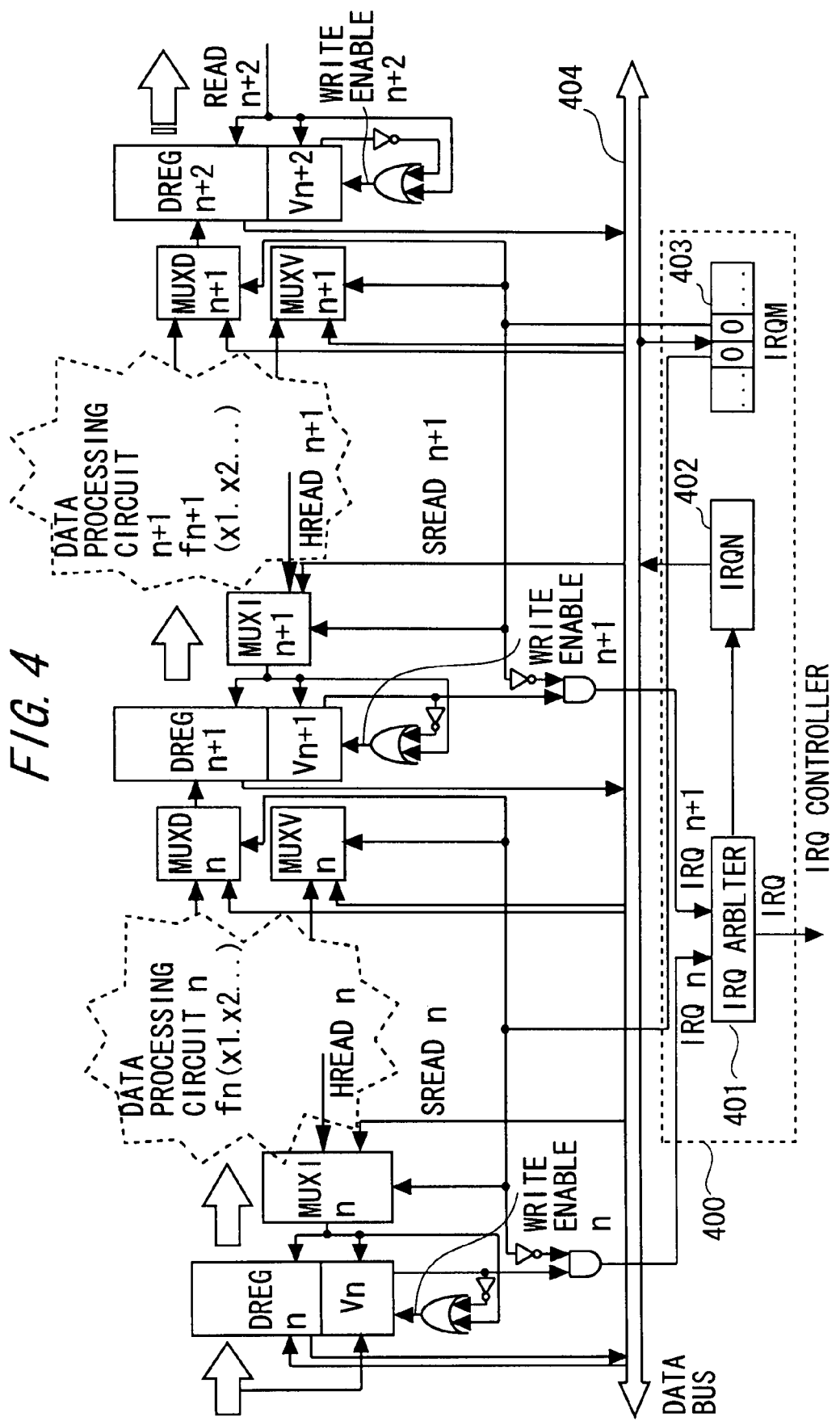
FIG. 4 is a block diagram showing an embodiment of a data processing device in a large-scale processing circuit.

FIG. 4 is a block diagram showing an embodiment of the data processing apparatus according to the present invention in the large-scale processing circuit. The data processing apparatus illustrated in FIG. 4 is constructed of the data processing units explained with reference to FIG. 3. These data processing units execute respectively, e.g., data processing algorithms fi (f0, ... fn, fn+1, ... ). The interrupt mask register of each of the data processing units is identified by a unit number (i). These interrupt mask registers are aggregated on a bit-by-bit basis by an interrupt controller (IRQ Controller) 400, thus constructing a new interrupt mask register IRQM403. Further, an interrupt request signal IRQi generated from each data processing unit is connected to an interrupt arbitrating unit (IRQ Arbiter) 401.

Each circuit unit can switch over each individual data processing method according to a setting value written to the interrupt mask register IRQM via a bus 404 by the software executed in the CPU 100. When a bit, of the interrupt mask register IRQM403, corresponding to any one of the data processing units is "1", the data processing of the data processing unit is executed by the hardware data processing circuit. When a corresponding bit, of the interrupt mask register IRQM403, corresponding to any one of the data processing units is '0', the data processing of the data processing unit is switched over by an interrupt to the software processing method in the CPU 100.

The interrupt request signal IRQn generated in each circuit unit is outputted to the interrupt controller (IRQ Controller), and the interrupt arbitrating unit (IRQ Arbiter) 401 judges according to a predetermined priority which interrupt request should be preferentially processed. A preferentially processed request number is written to an interrupt number register IRQN402, and an interrupt request signal IRQ is outputted to the CPU 100. Other not-yet-processed interrupt request signals are kept intact in a requesting status till getting processing-enabled. The CPU 100 responds to the interrupt request signal (i) outputted from the interrupt arbitrating unit (IRQ Arbiter) 401, thus switching over to the interrupt mode. The interrupt number (i) is outputted from the register IRQN402 via the data bus 404. The software executed by the CPU 100 issues a read signal SReadi to an input register DREGi of the data processing unit corresponding to this number (i) via the bus 404. With this operation, the CPU 100 reads the input data and executes the data processing by use of the corresponding algorithm fi. A processing result of the software is written to an output register DREGi+1 of the corresponding circuit unit via the bus 404. Then, if a new (not-yet-processed) interrupt request signal is selected by the interrupt control circuit (IRQ Arbiter) 401, the CPU 100 starts the data processing of the next circuit unit. Whereas if the not-yet-processed interrupt request signal is not generated, the CPU 100 returns to the normal processing mode.

Figure 5:
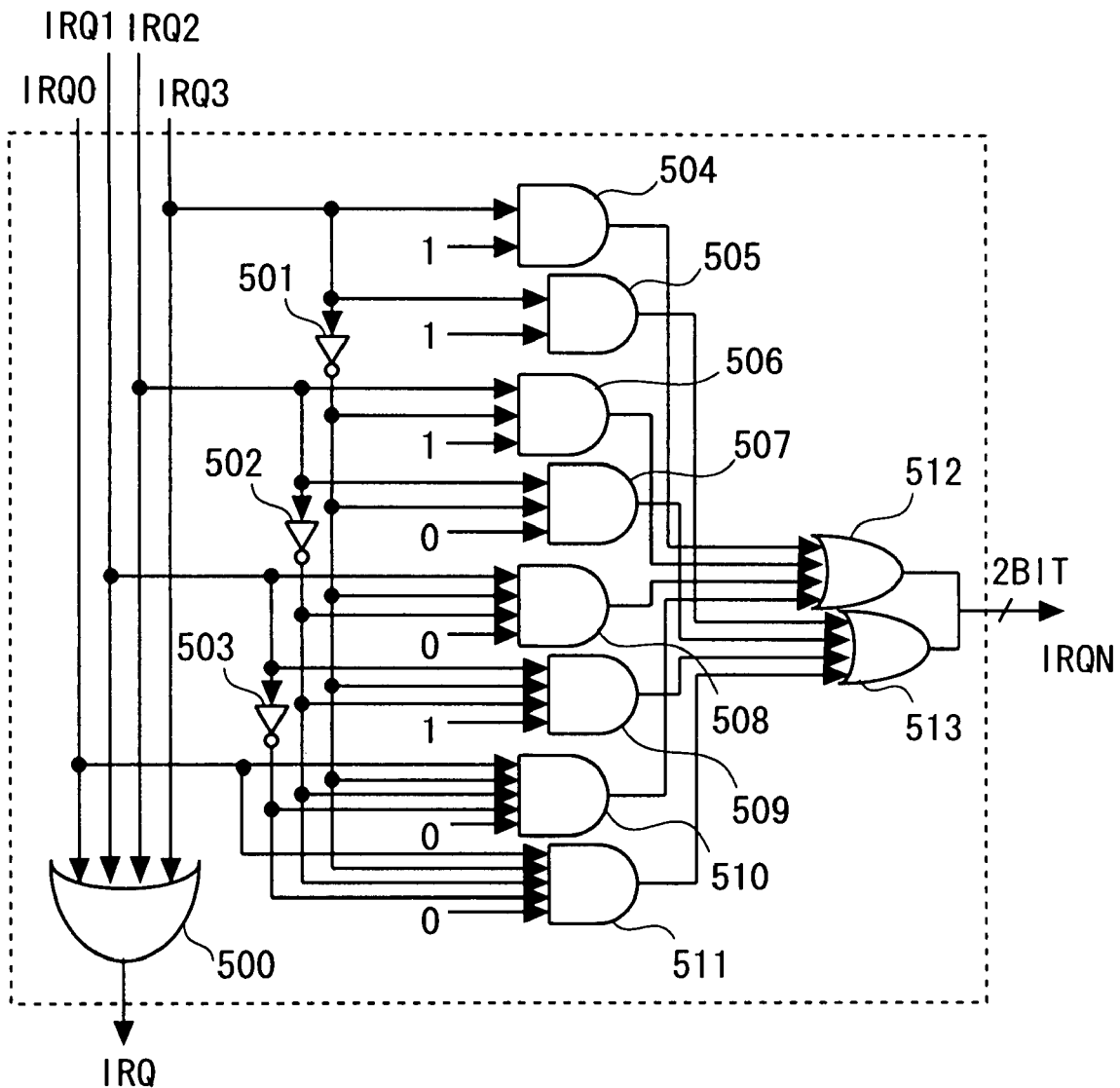
FIG. 5 is a block diagram showing an example of a detailed configuration of an interrupt arbitrating unit.

FIG. 5 shows an example of a detailed configuration of the interrupt arbitrating unit 401. In this example, when four interrupt request signals IRQ0-IRQ3 are inputted, the interrupt request signals are selected in a predetermined sequence (in the sequence of IRQ3, IRQ2, IRQ1, IRQ0 in FIG. 5) and outputted as IRQN402.

In this interrupt control circuit 401, NOT cells 501-503 determine an order of priority in the sequence of IRQ3, IRQ2, IRQ1, IRQ0. Further, the unit numbers ("i", i.e., the interrupt numbers "i") of the data processing units, which are determined in that order of priority, are coded by AND cells 504-511.

For instance, if only the interrupt request signal IRQ1 of the processing unit 1 and the interrupt request signal IRQ2 of the processing unit 2 get "High", at first, OR is obtained by an OR cell 500, and the interrupt request signal IRQ is generated. With the generation of the interrupt request signal IRQ, the interrupt request signal IRQ3 of the processing unit 3 is "Low", and hence outputs of AND cells 504, 505 become "0" while an output of the NOT cell 501 becomes "1". Since the interrupt request signal IRQ2 of the processing unit 2 is "High", AND cells 506, 507 obtain AND together with an output of the NOT cell 501 and with a processing unit number "10", and an output of the NOT cell 506 becomes "1" while an output of the AND cell 507 becomes "0".

Furthermore, the output of the NOT cell 502 becomes "0", so that irrespective of the interrupt request signals IRQ0, IRQ1 of the processing units 0 and 1, outputs of AND cells 508, 509, 510 and 511 become all "0". Finally, OR is obtained by OR cells 512, 513, and an outputted interrupt request number comes to "10". Accordingly, the interrupt request of the processing unit 2 is preferentially processed.

As described above, in the data processing device according to the present invention, if the troubles occur in some of the data processing circuits and in the case of there being the necessity of taking the measures against the troubles, or in the case of desiring to change some of the data processing algorithms f, only the trouble-occurred data processing units or only the data processing units of which the algorithms f be, it is desired, changed, are separated from the input data. The input data is processed by the software processing method executed in the CPU 100. This type of partial switchover to the software from the hardware enables the as-is continuous use of the product including the functions actualized by the hardware circuit.

As discussed so far, in the data processing device, in the case of the trouble being caused in the data processing circuit or in the case of desiring to change the data processing algorithm, the partial switchover to the software processing method enables the as-is continuous use of the product including the functions actualized by the hardware circuit. As a result, it is feasible to actualize cost-down and to reduce the number of processes of developing the product. Moreover, the present invention utilizes the register and the data bus existing in the conventional circuit as they are, and consequently it is possible to easily actualize a functional change of the product including the functions actualized hardwarewise with almost no rise in cost.

<Others>

The disclosures of Japanese patent application No. JP2006-219122 filed on Aug. 11, 2006 including the specification, drawings and abstract are incorporated herein by reference.

What is claimed is:

1. A data processing unit comprising:
   a storage unit retaining processing target data;
   a data processing circuit processing the data retained in the storage unit;
   a connection unit connected to a processing device that executes a computer program;
   a control unit invalidating, when a predetermined condition is detected, the data processing by the data processing circuit and requesting the processing device connected to the connection unit for the data processing, and an interrupt mask register that is set from the processing device via the connection unit, wherein the control unit includes a read control unit which provides the data processing circuit with the data in the storage unit in response to a first read request signal given from the data processing circuit, and provides the processing device with the data in the storage unit via the connection unit in response to a second read request signal given from the processing device, and wherein when a setting value in the interrupt mask register is a first value, the read control unit blocks the second read request signal, and provides the data processing circuit with the data in the storage unit.

2. The data processing unit according to claim 1, wherein the second read request signal is given from the processing device via the connection unit.

3. The data processing unit according to claim 1, wherein the control unit further includes a write control unit that selects one of output data given from the data processing circuit and output data given from the processing device via the connection unit, and gets the selected output data outputted to the storage unit.

4. The data processing unit according to claim 3, wherein the write control unit gets the output data of the data processing circuit outputted to the storage unit.

5. The data processing unit according to claim 4, wherein when the interrupt mask register takes a second value, the read control unit blocks the first read request signal given from the data processing circuit and provides the processing device with the data in the storage unit via the connection unit, and the write control unit gets the output data of the processing device outputted to the storage unit.

6. The data processing unit according to claim 1, wherein the storage unit includes:

a first storage unit stored with processing target input data to be processed by the data processing circuit or the processing device; and a second storage unit stored with output data processed by the data processing circuit or the processing device.

7. The data processing unit according to claim 6, wherein the read control unit, when a valid signal showing whether the input data is valid or not indicates validity, further provides the data in the storage unit.

8. The data processing unit according to claim 7, wherein the control unit further includes a write-to-the-first-storage-unit control unit that generates, when the read control unit provides the input data stored in the first storage unit to neither the data processing circuit nor the processing device and when the valid signal indicates that the input data is valid, a signal for inhibiting next processing target input data which should be processed next from being written to the first storage unit.

9. The data processing unit according to claim 6, further comprising:

a selecting unit selecting any one of a first valid signal supplied via the connection unit and showing whether the data processed by the data processing circuit is valid or not, and a second valid signal showing whether the data processed by the processing device is valid or not; and a register stored with a third valid signal that shows any one of the validity and the invalidity of the data in the second storage unit according to any one of the first valid signal and the second valid signal, which has been selected by the selecting unit.

10. A data processing apparatus comprising a connection unit connected to a processing device executing a computer program; and a plurality of data processing units connected to the processing device via the connection unit, each of the data processing units, including:

a storage unit retaining processing target data;

a data processing circuit processing the data retained in the storage unit;

a connection unit connected to a processing device that executes a computer program; and a control unit invalidating, when a predetermined condition is detected, the data processing by the data processing circuit and requesting the processing device connected to the connection unit for the data processing.

11. The data processing apparatus according to claim 10, wherein the control unit includes a read control unit that provides the data processing circuit with the data in the storage unit in response to a first read request signal given from the data processing circuit, and provides the processing device with the data in the storage unit via the connection unit in response to a second read request signal given from the processing device via the connection unit.

12. The data processing apparatus according to claim 10, wherein the control unit further includes a write control unit that selects any one of output data given from the data processing circuit and output data given from the processing device via the connection unit, and gets the selected output data outputted to the storage unit.

13. The data processing apparatus according to claim 12, further comprising an interrupt mask register retaining a plurality of bits each controlling a data processing method of a data processing unit corresponding to each of the bits, wherein when a setting value in any one of the bits in the mask register is a first value, a read control unit of the data processing unit corresponding to the bit blocks a second read request signal given from the processing device, and provides the data in the storage unit to the data processing circuit, and the write control unit of the data processing unit corresponding to the bit gets output data of the data processing circuit outputted to the storage unit.

14. The data processing apparatus according to claim 13, wherein when the setting value in any one of the bits in the mask register is a second value, the read control unit of the data processing unit corresponding to the bit blocks a first read request signal given from the data processing circuit, and provides the data in the storage unit to the processing device via the connection unit, and the write control unit of the data processing unit corresponding to the bit gets output data of the data processing device outputted to the storage unit.

15. The data processing apparatus according to claim 12, wherein the control unit includes a generating unit that generates a processing request signal for requesting, when a valid signal showing whether the input data is valid or not indicates the validity and when the bit in the interrupt mask register corresponding to the data processing unit including the control unit concerned takes a second value, the processing device to process the input data retained in the first storage unit of the data processing unit.

16. The data processing apparatus according to claim 15, further comprising:

a priority determining unit judging which process request signal should be preferentially processed among the process request signals generated by two or more data processing units; and a request retaining unit retaining, when one of the first read request signal and the second read request signal to be preferentially processed is selected, a request status till other not-yet-processed read request signals can be processed.

17. The data processing apparatus according to claim 15, wherein the process request signal contains identifying information for identifying each of the data processing units, and
the processing device includes an identifying information read unit reading the identifying information, reads the input data from the first storage unit of the data processing unit associated with the identifying information, processes the input data by use of an algorithm associated with the identifying information, and writes a processing result to a second storage unit of the data processing unit associated with the identifying information via the connection unit.

18. A data processing unit comprising:
a storage unit retaining processing target data;
a data processing circuit processing the data retained in the storage unit;
a connection unit connected to a processing device that executes a computer program; and
a control unit invalidating, when a predetermined condition is detected, the data processing by the data processing circuit and requesting the processing device connected to the connection unit for the data processing;
wherein the storage unit includes:
a first storage unit stored with processing target input data to be processed by the data processing circuit or the processing device; and
a second storage unit stored with output data processed by the data processing circuit or the processing device,
wherein when a valid signal showing whether the input data is valid or not indicates validity, the data in the storage unit is provided, and
wherein the control unit further includes a write-to-the-first-storage-unit control unit that generates a signal for inhibiting next processing target input data from being written to the first storage unit when the input data stored in the first storage unit is not provided to the data processing circuit and the processing device and when the valid signal indicates that the input data is valid.

* * * * *